United States Patent [19]

Ciciora

[11] 3,962,722
[45] June 8, 1976

[54] COLOR TELEVISION SETUP APPARATUS AND METHOD
[75] Inventor: Walter S. Ciciora, Park Ridge, Ill.
[73] Assignee: Zenith Radio Corporation, Chicago, Ill.
[22] Filed: Nov. 27, 1974
[21] Appl. No.: 527,556

[52] U.S. Cl............................. 358/10; 178/DIG. 4
[51] Int. Cl.².......................................... H04N 9/62
[58] Field of Search........................ 358/10, 1, 69;
178/DIG. 15, DIG. 4, 7.3 D

[56] References Cited
UNITED STATES PATENTS

| 2,701,275 | 2/1955 | Hulst | 358/69 |
| 2,752,418 | 6/1956 | Clapp | 358/69 |
| 2,910,615 | 10/1959 | Moulton et al. | 358/69 |
| 3,401,331 | 9/1968 | Mussulman | 178/DIG. 4 |
| 3,678,392 | 7/1972 | Houghton | 178/DIG. 15 |
| 3,804,531 | 4/1974 | Kosaka et al. | 178/DIG. 4 |

Primary Examiner—Robert L. Griffin
Assistant Examiner—R. John Godfrey
Attorney, Agent, or Firm—Nicholas A. Camasto

[57] ABSTRACT

Patterns indicative of the characteristics of contrast, brightness, color and tint are displayed on the picture tube of the television receiver. A plurality of photocells develop corresponding electrical signals responsive to the patterns. The signals drive peak detectors, the outputs of which are sampled at a regular rate. A neutral density filter is between the brightness pattern and its photocell, and when the sampled contrast and brightness outputs are subtracted in a subtractor, a null is obtained at the desired ratio. Color filters are interposed between the tint and color patterns and photocells and at the desired settings, subtraction of their outputs in a subtractor yields zero. A plurality of bi-directional motors are engageable with the receiver contrast, tint, brightness and color level adjustable elements. The contrast and tint adjustment elements are driven from the respective subtractor outputs, whereas the brightness adjustable element is controlled by the brightness peak detector output directly and the color level adjustable element is controlled by the sum of the color and tint peak detector outputs. The motors are stopped when all patterns correspond to desired settings. The method of automatically setting up a color television receiver is also described.

14 Claims, 3 Drawing Figures

COLOR TELEVISION SETUP APPARATUS AND METHOD

BACKGROUND OF THE INVENTION

This invention relates broadly to methods and apparatus for uniformly establishing viewable characteristics, such as brightness and contrast, of television receivers. In particular, it relates to means for automatically "setting up" color television receivers in a factory environment.

As is readily obvious to most television viewers, it is difficult to obtain similar renditions of like program material on different receivers, even though the receivers are produced by the same manufacturer. With color receivers the differences are more pronounced in that the eye is extremely sensitive to chromatic differences in a side-by-side viewing situation. The problem stems mainly from the fact that "set up" of receiver characteristics, such as brightness, contrast, color saturation and tint involves highly subjective judgments which must be made fairly rapidly. To alleviate this condition, most manufacturers utilize some form of instrumentation to assist skilled technicians in factory adjustment of television receivers.

As is well known, color television receivers include picture tubes having viewing screens comprising a plurality of individual phosphor deposits which, when excited by electrons, emit light of individually different colors. Conventionally, red-light emitting, blue-light emitting and green-light emitting phosphors are used. Such tubes also include some type of parallax barrier or shadow mask between the electron beam gun assembly and the phosphor deposits for shadowing the different colored-light emitting phosphor deposits from electrons emitted by other than their corresponding electron guns.

Some known ways of setting up color receivers in the factory utilize photocells for developing electrical signals in accordance with the light characteristics produced by a test signal pattern displayed on the reciever picture tube, for operating electrical meters or "go", "no-go" lights which the operator notes as he adjusts the various receiver adjustable control elements. Unfortunately, the viewable characteristics are not independent of each other and the corresponding receiver control elements are thus interactive. The operator, therefore, must move from control to control while noting the effect of adjustments on the meters or lights in an attempt to arrive at the correct settings. For example, the brightness of the displayed image will be affected by the contrast setting and vice versa as will color saturation and tint. Further, the operator is generally trying to obtain a maximum reading and it is difficult to determine because the response is somewhat broad. Consequently, it is a difficult operation to adjust these four characteristics utilizing techniques of the prior art.

A further problem is introduced by the parallax barrier (shadow mask) in color picture tubes which intercepts a major portion of the electron beams directed toward the screen. The energy dissipated at the mask causes it to experience thermal changes, not only affecting its position relative to the screen, but also changing the size of its apertures. Also, to minimize the effect of adjustment errors, it is desirable to produce high brightness and contrast levels in the test pattern which causes small areas of the shadow mask to absorb intense electron beam energy. The local heating of these mask areas results in receiver settings which are abnormal. Thus the technician tends to make adjustments as rapidly as possible to minimize the influence of these temperature effects on the meter readings.

In the last few years, many color television receiver manufacturers have incorporated a "preset" or "factory adjustment" position to enable the viewer to switch the receiver to optimum factory setup conditions. These preset factory adjustments may be established by an alternate set of viewer-inaccessible control elements which are rendered operational by a viewer-accessible switch. Some other arrangements have a single set of operating control elements and the preset condition is established by switching range-restricting networks into circuit with the control elements.

A common cause of complaint on the part of new color set owners is that of improper receiver setup for which a service call is normally required. Without some objective criteria againt which the receiver factory setup may be judged, it is all but impossible to reduce the number of such service calls sinve the uniformity of the product leaving the factory cannot be sufficiently controlled. It is, therefore, very desirable to have some method and apparatus available, in the factory, for establishing the color characteristics of a receiver in an objective manner and thus insuring a high degree of uniformity in setup.

OBJECTS OF THE INVENTION

A major object of this invention is to provide an improved method and apparatus for establishing viewable operating characteristics of a television receiver.

Another object of this invention is to reduce the cost of manufacturing color television receivers.

A further object of the invention is to produce television receivers having a higher degree of uniformity in viewable characteristics.

SUMMARY OF THE INVENTION

In accordance with a broad aspect of the present invention, method and apparatus are provided for automatically adjusting a selected characteristic of a television receiver to a desired level by displaying a predetermined pattern on the receiver picture tube, generating a signal indicative of the characteristic, and developing an error signal based on the difference between the actual and desired characteristic setting for driving a motor engageable with the receiver adjustable element affecting the selected characteristic.

A further aspect of the invention is directed toward tailoring the generated signals indicative of the selected characteristics such that the desired characteristic settings may be made in a highly accurate and substantially independent manner, thus minimizing the interaction between the receiver adjustable control elements.

BRIEF DESCRIPTION OF THE DRAWINGS

Other objects and advantages of the inventive method and apparatus will become apparent upon reading the specification in conjunction with the drawings in which.

DESCRIPTION OF THE PREFERRED EMBODIMENT

Figure 1:
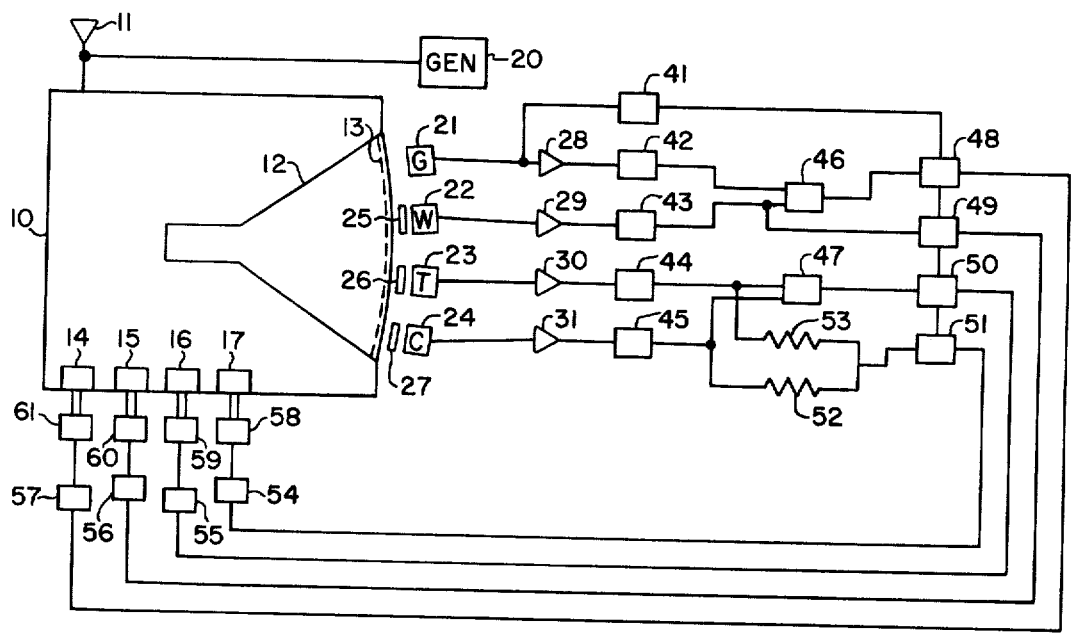
FIG. 1 is a block diagram pictorial representation of automatic color television setup apparatus constructed in accordance with the invention.

In FIG. 1, reference numeral 10 indicates a television receiver having an antenna 11, a color picture tube 12, including a shadow mask or parallax barrier 13 positioned closely adjacent the viewing screen, and a plurality of adjustable control elements 14–17 for adjustment of various veiwable characteristics of the receiver. These characteristics may be, for example, brightness, contrast, color saturation and tint. A signal generator 20 is shown connected to antenna 11 for establishing on the viewing screen of picture tube 12 patterns for aiding in setup of the television receiver.

A plurality of photocells 21–24 are shown positioned adjacent the viewing screen of picture tube 12. It will be appreciated that, while the photocells are shown in an in-line configuration, they may be arranged in any manner desired adjacent the faceplate of picture tube 12, but preferably in a generally rectangular array overlying the patterns shown in FIG. 2. Three of the photocells have filter elements 25, 26 and 27 interposed between them and the patterns on the picture tube viewing screen.

The photocells are connected respectively to a plurality of amplifiers 28–31 which are further respectively connected to a plurality of peak detectors 42–45. A block 41 contains timing and failure mode protection circuitry for the system. A pair of amplifiers 46 and 47 (called subtractors) are connected to the outputs of peak detectors 42 and 43, and 44 and 45, respectively. The amplified outputs of corresponding pairs of photocells are algebraically added in these amplifiers and the resultant error, in the form of a difference signal, is supplied to one of comparator circuits 48 or 50. The comparator circuits analyze the output of the subtractors and develop appropriate up or down motor control potentials for a plurality of bi-directional motors 54–57, which are preferably of the step-drive type. A plurality of couplings 58–61 are mounted to corresponding ones of motors 54–57 for respective engagement with the shafts of receiver adjustable elements 14–17.

Peak detector 43 supplies comparator 49 directly instead of being coupled through a subtractor, whereas both peak detectors 44 and 45 supply a portion of their outputs, through a pair of resistors 52 and 53, to comparator 51. This arrangement of peak detectors and subtractors provides a very high degree of independence between the brightness, contrast, saturation and tint adjustments and enables rapid and accurate settings of the receiver control elements to produce the desired characteristics. While the independence attained enhances manual adjustment of a receiver, the full value of the invention is derived in an automatic adjustment environment. It will also be appreciated that for accuracy the receiver and picture tube should be at normal operating temperature during setup. Accordingly, a random display pattern is preferably maintained on the picture tube until the setup adjustments are to be made. It is also advantageous to engage the motor couplings with the adjustable element shafts before switching on the test patterns, to preclude local heating of the aperture mask.

Figure 2:
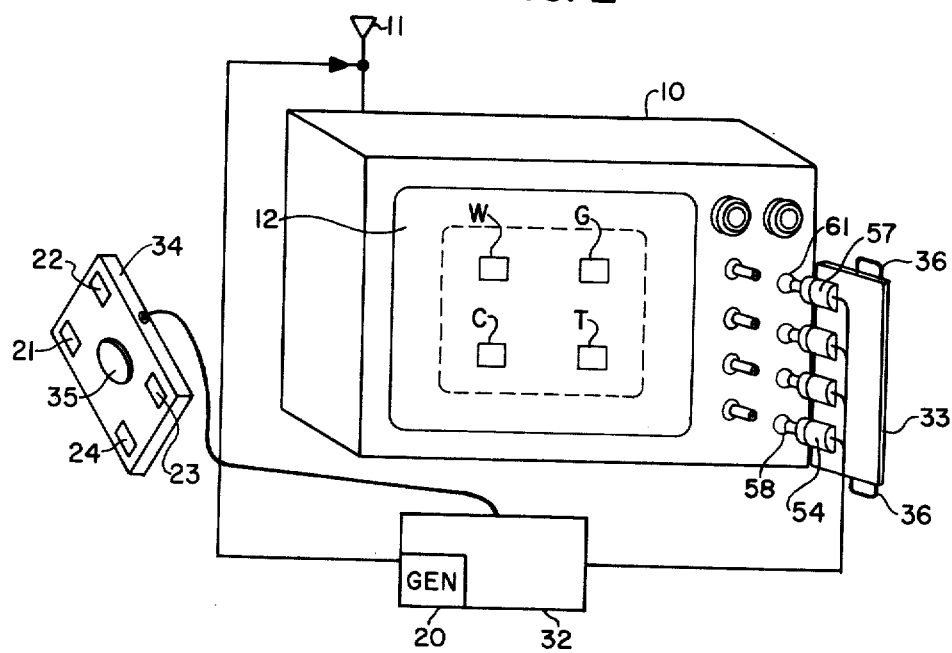
FIG. 2 is a representation of a color television receiver being adjusted with the apparatus of FIG. 1.

In FIG. 2 the control apparatus is shown as a block 32 with a portion thereof indicated as signal generator 20. The generator provides a signal to the antenna of the television receiver for displaying patterns comprising small squares rectangularly disposed on the face of the picture tube 12. The squares are labelled W, G, C and T for white, grey, color level and tint. An assembly 34 supports the photocells (and filters) in positions corresponding to the display patterns W, G, C and T. The assembly may be temporarily fastened to the face of the picture tube 12 through any well-known means, a suction cup 35 being illustrated. Assembly 34 will occupy the dashed line area shown on the face of picture tube 12. Any well-known means of aligning assembly 34 with the display patterns may be utilized. For example, the assembly may cover the entire tube face and be aligned by the receiver escutcheon. The use of photocells mounted adjacent displayed test patterns for assisting in the alignment of television receivers is old in the art and need not be discussed in detail.

The shafts of adjustable control elements 14–17 are shown extending from the front of the receiver cabinet. It will be obvious that the control elements need not have shafts, but may be adjustable by a screwdriver or the like mating with a slot in the adjustable member of the control element. The coupling devices 58–61 of bi-directional motors 54–57 are shown mounted to a common support 33, having a pair of handles 36 affixed thereto. The arrangement of the motors and couplings is made to accommodate the particular arrangement of adjustable control elements on the particular model television receiver being produced. In some receivers these control elements may be accessible on a rear apron or through a side panel, whereas in others they may be part of a dual control element arrangement and accessible by removal of viewer-operated knobs. In any case, it is understood that the coupling devices for engaging these shafts have end means compatible with the shafts or slots for readily engaging them. The handles are obviously to enable a technician to hold support 33 with the motors and coupling devices in engagement with the adjustable element shafts. It will be readily envisioned that suitable apparatus may be designed to enable engagement between the motors and shafts without the intervention of a technician.

An important aspect of the invention is in the circuit arrangement whereby the brightness and contrast adjustments may be made without substantial interaction. Consider, for example, that display pattern G is a grey area and display pattern W is a white or bright area. The ratio of the desired brightness of these two areas may be established as $B_w/B_g = K$ (a constant). If the brightness of these areas is measured by photocells, the electrical signals obtained may be subtracted. If prior to subtraction the output of the photocell measuring white is electrically attenuated by a factor of $1/K$, their electrical sum will be zero ($B_g = B_w/K$) when at the desired setting. Alternatively, optical attenuation may be utilized by a neutral density filter, illustrated by filter 25 in the preferred embodiment interposed between the W pattern and its corresponding photocell. If the brightness setting of the receiver is varied by an amount $\Delta$, it can readily be shown that the difference is brightness of both the grey and white areas will change by $\Delta (1-1/K)$, upsetting the null and yielding opposite sign results, depending upon the direction of the error in brightness setting.

Contrast, however, is a multiplicative phenomenon, and as such, any error in the contrast setting will not affect the brightness null. (The actual brightness of the areas will change, but the ratio will not.) Consequently, the contrast may be set to produce a specified output from either photocell. Thus, when the brightness is set first, the contrast setting may be established with substantial independence. If the contrast setting is made first, it may require some change when the brightness is established.

Similarly, it may be shown that the light from the color patterns C and T may be treated to result in nearly independent tint and color saturation adjustments. For example, assume an artificial video signal, consisting of a zero average luminance level 3.58 MHz sine wave modulated onto a suitable carrier, is impressed upon antenna 11 by generator 20. It must be remembered that this does not correspond to a real situation since there is no color signal with a zero luminance level. Practically, the "negative" color portions result in the appropriate electron guns being cut off. Thus between 327° and 146°, the green gun is cut off, between 180° and 360°, the red gun is cut off and between 90° and 272°, the blue gun is cut off.

With one 3.58 MHz pattern at 90° and another at 272°, the 90° pattern will only contain light from the red phosphor and the 272° pattern will only contain light from the green phosphor since for both patterns the blue and green guns are cut off. If filters for observing only blue light are placed over these patterns, no light will pass. If the tint setting of the receiver is misadjusted to produce negative phase angle errors (the receiver shifts the phases of 90° and 272° to 80° and 262°, for example), blue light will be observed in the predominantly red pattern but not in the green pattern. A positive phase angle error will cause the opposite result, with the blue appearing in the green pattern, but not in the red. Again, if photocells are placed behind the filters and their outputs electrically subtracted, zero will be obtained for the correct tint adjustment and opposite polarity error signals obtained for positive and negative errors in tint setting.

This technique increases dramatically the accuracy with which the tint setting may be made. As a by-product of this accurate tint setting, the color level setting may be taken made with little error. Since there is no blue output, it is obvious that another color must be selected to establish the proper or desired color level. This may be readily accomplished by monitoring one color (red, green or combination thereof) while adjusting color saturation until a predetermined output is obtained.

It will be appreciated that any phase 3.58 MHz signal may be supplied to the receiver to produce known photocell outputs for that particular color at the correct tint setting. The outputs may be subjected to attenuation as was discussed above for brightness and subtracted to produce a null at the correct setting. Again because of the highly accurate tint setting substantial independence between the color saturation and tint setting is obtained. In the preferred embodiment, almost complete independence of tint and saturation settings is obtained by setting tint first and adding the outputs of both photocells when setting color saturation.

The display patterns are arranged rectangularly on the television screen and, remembering that these patterns are formed by simultaneous rapid horizontal and much slower vertical, scansion of electron beams across the screen, it will be apparent that the pulse signals from the photocells adjacent the upper rectangles do not occur at the same time. If the output signals are to be compared, they must be in the same timing relationship. The circuit of the invention accomplishes this by providing peak detectors for stretching the pulses for a time sufficient to insure that both signals are present during the comparison interval and consequently may be operated upon by the subtractor networks. Actually the pulse outputs of all four photocells undergo comparison at the same time. As the pulse outputs corresponding to the patterns occur at the vertical deflection or scansion rate (60 Hz), the information in the peak detectors is removed (the detectors are switched) so that they are ready to receive new information at this rate. Similarly, since the control information will be shown to be in pulse form, D-type flip-flops are used to provide continuous signals to the motor control circuits. These flip-flops are also switched, and all switching is performed by timing apparatus in block 41, to be discussed.

Figure 3:
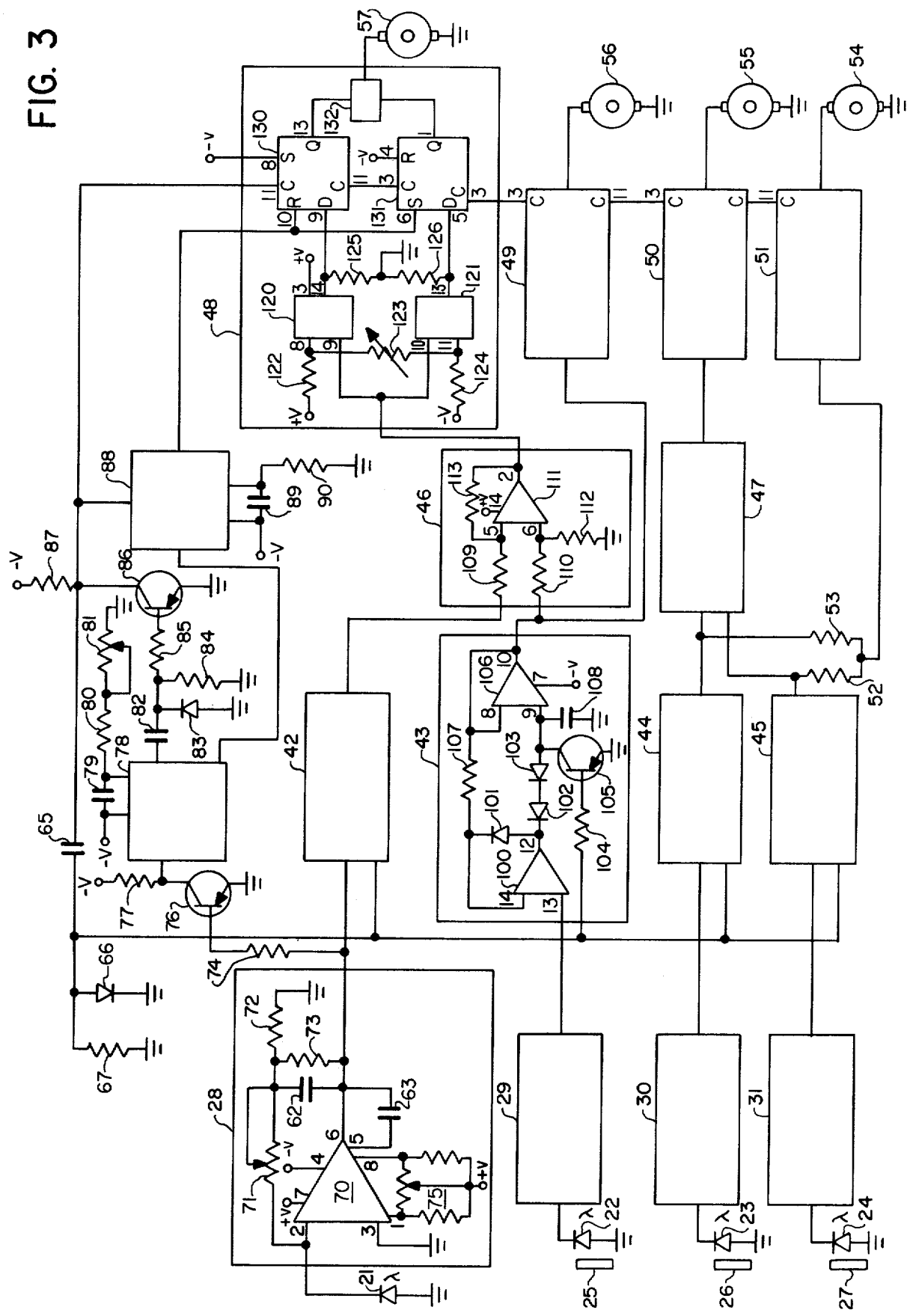
FIG. 3 is a combination block and schematic diagram of portions of the control apparatus broadly shown in FIG. 1 and 2.

Referring now to FIG. 3, photocells 21–24 are indicated symbolically as diodes with the Greek letter $\lambda$ alongside. The photocells may either be of the photoresistive type, where resistance is changed as a function of incident light intensity, or preferably of the photovoltaic type where voltage is developed in response to incident light. Photocell 21 is coupled to amplifier 28 which includes an operational amplifier 70. The signal output of photocell 21 comprises a pulse at the vertical sweep frequency rate of 60 Hz. The amplitude of the pulse is a function of the light output of the display pattern as it is formed by the electron beams in the cathode ray tube. Consequently, there are 15.750 kHz noise components in the pulse.

The numbers appearing adjacent the operational amplifier symbol refer to its terminals and are included to readily enable one skilled in the art to duplicate the circuit. A capacitor 63 and a resistor network 75 comprise a normal complement of parts for use with the operational amplifier and full instructions as to value selection are supplied by the manufacturer. Operational amplifier 70 is available under the designation AD504 from Analog Devices Inc. of Norwood, Massachusetts. A sensitivity adjustment is provided by potentiometer 71 in conjunction with resistors 72 and 73. A filter capacitor 62 bypasses any 15.750 kHz noise present in the operational amplifier output. Amplifiers 29, 30 and 31 are identical to amplifier 28 and have similar type output signals.

Referring to amplifier 29, its output supplies peak detector 43 which includes operational amplifiers 100 and 106, a reset transistor 105 and a storage capacitor 108. Amplifier 106 acts as a buffer and its output is connected by a feedback resistor 107 to the input of amplifier 100. Peak detector 43 functions to stretch the pulse output of amplifier 29 at or near its peak level. The level is maintained until reset transistor 105 is driven into conduction to discharge capacitor 108.

In response to a pulse signal from amplifier 29, capacitor 108 is charged through series connected diodes 102 and 103. When capacitor 108 reaches a charge level corresponding to the peak of the pulse signal, conduction through diodes 102 and 103 ceases and the charge on the capacitor is maintained (transistor 105 is cut off). A diode 101 is provided between the output and input of amplifier 100 to keep it from going into saturation when the normal feedback path of diodes 102 and 103 is broken by capacitor 108 charging to the peak signal pulse amplitude. This charge remains on capacitor 108 until an appropriate signal is supplied to the base of reset transistor 105, through current limiting resistor 104, at which time capacitor 108 rapidly discharges through the collector of transistor 105. Thus in response to the pulse signal from amplifier 29, peak detector 43 provides a constant level output.

The other peak detectors 42, 44 and 45 are identical to peak detector 43 with the exception that they do not include a diode 103. It will be noted that during normal operation, the contact potential of diode 103 (and diode 102) has no effect on the circuit operation since it is electrically removed from the feedback loop when capacitor 108 is charged. As will be discussed, diode 103 is added to prevent system failure in the event amplifiers 28 and 29 are in saturation and incapable of transmitting differences in the ouput levels of their respective photocells. Operational amplifiers 100 and 106 are one-half of a package of four such amplifiers obtainable under the designation RC4136D from Raytheon of Mountainview, California.

The outputs of peak detectors 42 and 43 are supplied directly to subtractor network 46 which develops an output signal as a function of its two input signals. If the two input signals from peak detectors 42 and 43 are equal, the output of subtractor 46 is zero indicating that the light intensity of the respective photocells is correct to attain the desired setting of the corresponding receiver characteristic. An identical subtractor network 47 is supplied input signals from peak detector 44 and peak detector 45.

The output of subtractor 46 is supplied to block 48 which includes a pair of comparators 120 and 121 feeding a pair of D-type flip-flops 130 and 131. The output of the flip-flops supply a motor drive circuit 132 which, in turn, supplies appropriate drive current to bi-directional motor 57. Motor 57 and motors 54–56 are preferably of the type which may be incrementally advanced in either direction. Both the motor drive circuits and the motors are entirely conventional and readily available commercially.

The output of peak detector 43 is also supplied to block 49 (functionally identical to block 48) which is coupled to motor 56. Similarly, the outputs of peak detectors 44 and 45 are supplied to subtractor 47 which, in turn, feeds block 50 for controlling motor 55 and, through a pair of resistors 52 and 53, block 51 which controls motor 54. The circuits are functionally identical with the exception of resistors 52 and 53 for adding the outputs of peak detectors 44 and 45 before application to block 51.

One input of comparator 120 is supplied from +V through a resistor 122 and the other input is supplied by subtractor 46. One input of comparator 121 is supplied from −V through a resistor 124 and its other input from subtractor 46. A variable resistance 123 interconnects resistors 122 and 124 and is utilized to establish a "dead band" for the comparators. The comparators compare the voltage levels on their two inputs and produce a zero or predetermined logic voltage output, depending upon the amount of the difference. The dead band is defined by the amount of subtractor 46 output signal variation which occurs before either comparator operates to give a logic voltage output. Thus the comparators are essentially analog-to-digital converters since they take a difference signal and convert it to an output of a given magnitude. Resistors 125 and 126 are load resistors for the comparators. The comparators are obtainable in packages of four from National Semiconductor of Santa Clara, California under type designation LM339N.

The output of the comparators feed D terminals of flip-flops 130 and 133, which function to store the comparator output and produce control voltages for motor control 132 to indicate the direction of rotation required of motor 57. The flip-flops are available from RCA Corporation of Summerville, New Jersey, under type No. CD4013AE.

The timing sequence for the system is initiated by a switching transistor 76, the base electrode of which is coupled through a resistor 74 to the output of amplifier 28. In response to a pulse from amplifier 28, transistor 76 is driven into conduction and develops a potential across a load resistor 77 which switches a non-retriggerable monostable multivibrator 78. Multivibrator 78 switches to its other state for a predetermined time interval which, as is well known, may be established by adjustment of appropriate time constant determining networks coupled to the device (capacitor 79, resistor 80 and variable resistor 81). The output of multivibrator 78 is supplied to a capacitor 82 connected to ground through the parallel combination of a diode 83 and a resistor 84. These latter three elements function as a clamp and differentiator for supplying a turn-on pulse to a switching transistor 86 on the negative or trailing edge of the multivibrator output pulse. Thus, transistor 86 is driven into conduction when multivibrator 78 returns to its stable state after a time interval determined by its time constant network.

A load resistor 87 is coupled between −V potential and the collector of transistor 86 and supplies pulse energy directly to the C or clock terminals of the flip-flops and to peak detectors 42–45 through a capacitor 65. Capacitor 65 is coupled to ground through the parallel combination of a resistor 66 and a diode 67 and these three elements also serve as a clamp and differentiator for turning on the transistors in the peak detectors on the trailing edge of the pulse. Thus transistor 105 in peak detector 43 is turned on and discharges capacitor 108 thus erasing the information supplied from photocell 22 in amplifier 29. The pulse supplied to the C terminals of the flip-flops "loads" them with the information from their respective comparators. (The flip-flops all receive the pulse from transistor 86 as indicated by the interconnection of the C terminals.) The pulse generated by transistor 86 is a positive going clock pulse and, since the triggering of the transistors in the peak detectors is performed by the negative going edge of this pulse, the peak detectors are reset after the flip-flops are loaded. This prevents information in the peak detectors from being erased before setting the flip-flops.

The disclosed apparatus includes failure mode circuitry which, while not part of the present invention, contributes to the enhanced operation thereof. In the event that the receiver brightness setting is too low, there may be no light output from the patterns and the system will indicate that the correct brightness ratio, and hence the desired setting, has been attained. Note that under these conditions, the outputs of peak detectors 42 and 43 will be the same, indicating correct brightness setting. To preclude this failure mode, an output of non-retriggerable monostable multivibrator 78 is supplied to a retriggerable monostable multivibrator 88 which, in turn, supplies the R (reset) input of flip-flops 130 and the S (set) input of flip-flop 131. The other flip-flops (not shown) in blocks 49–51 are not supplied with the signal from multivibrator 88. As is well known, a retriggerably monostable multivibrator, when switched to its unstable state, may be maintained in that unstable state by repetitive triggering pulses. The time constant for multivibrator 88 is established by a capacitor 89 and a resistor 90 such that under normal conditions of output signal from amplifier 28, it is supplied pulses from multivibrator 78 often enough to keep it in its unstable state. Should the output of multivibrator 78 disappear as would occur, for example, when there is no light from the television picture tube screen, multivibrator 88 returns to its stable state and places a potential on the S terminal of flip-flop 131 and R terminal of flip-flop 130, causing a "brightness up" control signal to motor 57. Consequently, the brightness setting is advanced. The multivibrators are available in a single package designated as MC14528CP by Motorola Semiconductor of Phoenix, Ariz.

Another failure mode may occur if the brightness setting is misadjusted to a maximum or near maximum condition and drives amplifiers 28 and 29 into saturation. In saturation, the amplifiers produce equal outputs even though the inputs from the photocells are unequal. Under these saturation conditions, peak detectors 42 and 43 would normally produce equal outputs and subtractor 46 would indicate that the proper brightness setting has been attained. However, as mentioned earlier, diode 103 in peak detector 43 is provided to preclude a determination of proper brightness setting in this situation. It will be recalled that normally the diode contact potential is taken up or compensated for by the feedback loop. Under saturation conditions the feedback loop of peak detector 43 is broken and the extra contact potential of diode 103 is not compensated with the result that the output of peak detector 42 falls below that of peak detector 43 to indicate a too high brightness setting condition to subtractor 46 which, in turn, sends a brightness decrease signal to motor 57.

It will be recalled that the pulse of 3.58 MHz signals for the tint and saturation patterns were selected to produce a known amount of a particular color phosphor light output in each pattern. For simplicity, assume that the 3.58 MHz signals are selected to produce equal amounts of blue in the two patterns, which corresponds to phases of 60° and 300°, respectively, representing magenta and cyan. With the blue filters used, it was found that when the output of one of the photocells was used to determine the color saturation level, a larger comparator dead band was needed. This was so, since any phase error introduced by the receiver tint network (improper tint setting) changed the level of the blue light in the patterns, and consequently when a correct tint setting was attained, a further saturation correction was needed. While the amount of interaction was not great, because of the great accuracy with which the tint setting is made, the addition of resistors 52 and 53 for adding the outputs of both the white and grey photocells practically eliminates all interaction and enables a smaller dead band with consequent increase in setup uniformity between receivers. For magenta and cyan small phase errors in either direction tend to produce equal and opposite changes in blue in the two patterns and consequently the sum of the contribution from both patterns is constant. Thus a great degree of independence is obtainable between the tint and saturation settings by the addition of this circuitry.

It will be appreciated that the described inventive method may be performed manually with great advantage because of the independence obtained between the brightness and contrast settings and the tint and saturation settings. Certainly, the need for skill and speed on the technician's part is greatly lessened. For greatest benefit, the method may be practiced with the motorized apparatus disclosed wherein all elements are preferably adjusted simultaneously in a servo loop system.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. The method of establishing first and second viewable characteristics of a television receiver at desired settings comprising the steps of:
   displaying first and second patterns on said tube differing in said first characteristic;
   generating a first signal indicative of said first characteristic in said first pattern and a second signal indicative of said first characteristic in said second pattern, said signals being proportioned to bear a predetermined ratio when at said desired setting for said first characteristic; and
   adjusting said first characteristic of said receiver until said predetermined ratio is obtained and said second characteristic until its desired setting is attained.

2. The method of claim 1 wherein said first characteristic is brightness and said second characteristic is contrast.

3. The method of claim 2, wherein said receiver is a color television receiver including a multicolor picture tube and wherein third and fourth chromatic characteristics are established at desired settings, including performing said steps for said third and fourth characteristics with third and fourth patterns displayed on said tube.

4. The method of claim 3, wherein said third characteristic is tint and said fourth characteristic is color saturation.

5. The method of claim 4, wherein said picture tube has a parallax barrier type viewing screen, said receiver includes adjustable elements for adjusting said characteristics, motor driven apparatus is employed for automatically adjusting said adjustable elements in response to the magnitude and polarity of the deviation of said signals from said predetermined ratio and wherein all of said steps are performed substantially simultaneously.

6. The method of claim 5, wherein said receiver is maintained at operating temperature and a randomly variable pattern is displayed on said viewing screen prior to displaying said patterns.

7. The method of claim 6, further including an initial step of:
   engaging said motor driven apparatus with said adjustable elements before displaying said patterns to preclude adverse effects of temperature induced local distortions of said parallax barrier.

8. A setup system for establishing first and second related viewable characteristics of a television receiver at desired settings comprising:
   signal generation means for producing first and second patterns on the picture tube of said receiver which differ in a first of said viewable characteristics;
   light sensitive means generating a first signal indicative of said first characteristic in said first pattern and a second signal indicative of said first characteristic in said second pattern, said first and second signals bearing a predetermined ratio when said first characteristic is at said desired setting;
   means for adjusting said first characteristic of said television receiver until said predetermined ratio is obtained; and
   means for adjusting said second characteristic of said television receiver to its desired setting.

9. A setup system as set forth in claim 8, wherein said first characteristic is brightness and said second characteristic is contrast.

10. A setup system as set forth in claim 8, wherein said first characteristic is tint and said second characteristic is color saturation.

11. A setup system for automatically establishing and second viewable characteristics of a television receiver at desired settings, said receiver including adjustable elements for adjustment of said characteristics, comprising:
   signal generation means for producing first and second patterns on the picture tube of said receiver which differ in the first of said viewable characteristics;
   light sensitive means comprising photocells positioned adjacent to said picture tube in alignment with corresponding ones of said patterns for generating a first signal indicative of said first characteristic in said first pattern and a second signal indicative of said first characteristic in said second pattern;
   motor means engageable with said adjustable elements; said first and second signals bearing a predetermined ratio when said first characteristic is at its desired setting;
   means operating said motor means for adjusting said adjustable elements until said signals indicate said characteristics are at said desired settings including
   first means for adjusting said first characteristic of said television receiver until said predetermined ratio is obtained; and
   second means for adjusting said second characteristic of said television receiver to its desired setting.

12. A setup system as set forth in claim 11, wherein said first characteristic is brightness and said second characteristic is contrast.

13. A setup system as set forth in claim 11, wherein said first characteristic is tint and said second characteristic is color saturation.

14. A setup system as in claim 12, wherein a neutral density filter element is interposed between one of said photocells and its corresponding pattern.

* * * * *